F. A. LUCKENBACH & A. DE BEVOISE.
Method of Drying, Curing, and Renovating Indian
Corn and other Cereal Grains.
No. 205,660. Patented July 2, 1878.
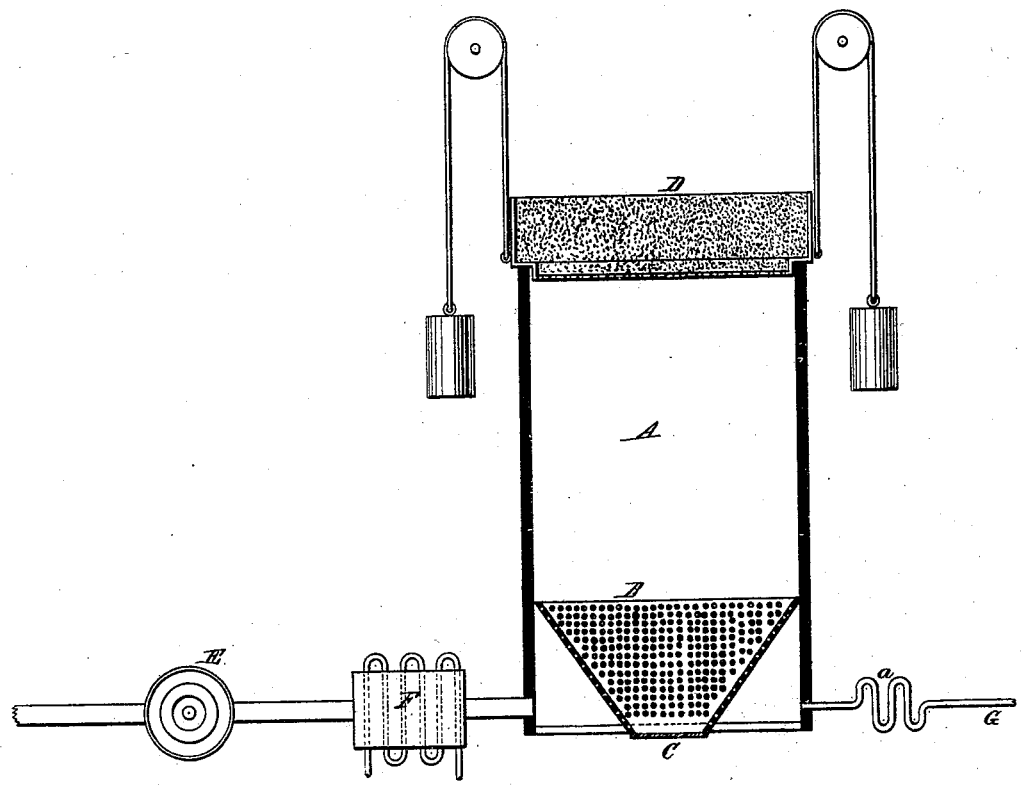

UNITED STATES PATENT OFFICE.

FREDERIC A. LUCKENBACH, OF NEW YORK, AND ABRAHAM DE BEVOISE, OF BROOKLYN, ASSIGNORS TO JOHN E. MULFORD, OF NEW YORK, N. Y.

IMPROVEMENT IN METHODS OF DRYING, CURING, AND RENOVATING INDIAN CORN AND OTHER CEREAL GRAINS.

Specification forming part of Letters Patent No. 205,660, dated July 2, 1878; application filed May 21, 1878.

*To all whom it may concern:*

Be it known that we, FREDERIC A. LUCKENBACH, of the city of New York, in the county and State of New York, and ABRAHAM DE BEVOISE, of Brooklyn, in the county of Kings and State of New York, have jointly invented a certain Improvement in the Art of Drying and Curing Corn and other Grains, of which the following description is sufficiently full, clear, and exact to enable others skilled in the art to carry out the said improvement.

The accompanying drawing is an axial section of one form of apparatus, representing a convenient arrangement of the essential elements and adjuncts to be employed in operating upon the grain in accordance with our improved process.

The invention relates to the treatment of grains to adapt them for storage or transportation without loss or deterioration, and for subsequent use for food; and it (the invention) consists in an improved method of killing the germ and removing surplus moisture rapidly without parching the grain or destroying its flavor or nutritious properties, as will be hereinafter first fully described, and then pointed out in the claim.

In the transportation of grain, more especially of Indian corn in bulk, as in transportation to foreign countries, which requires the confinement of large bodies of it for several days in poorly-ventilated vessels, it generally becomes heated, musty from the growth of fungus, &c., and frequently sour from partial fermentation and its natural tendency to germinate. In this condition the grain is suitable only for distilling purposes and manufacturing uses, and is unfit for a healthful and substantial food, as it is when in good condition and properly prepared.

Like hurtful results are occasioned by storage of the grain in poorly-ventilated warehouses, in cars, and similar situations.

Numerous processes have been devised with a view to obviate these difficulties; but, so far as we are aware, the previously-existing methods have not fully answered the requisite purposes. Either the germ is not killed, or the drying of it is not properly effected, or the grain is parched and its flavor and nutritious properties destroyed, by employment of these heretofore-known processes, and also, by their employment, a considerable difficulty has been encountered in the necessarily slow and expensive handling and treatment of the grain—matters of considerable importance in the successful operation of any proposed method.

To accomplish the several objects of our invention, we employ one or more tanks, as A, made of suitable material, preferably sheet-iron, and these we find it most convenient to construct so as to hold from about three hundred to five hundred bushels of grain each.

Within the tank is secured a heavy foraminated funnel, B, extending a little distance above the bottom, thus leaving a chamber between the lowermost portion of the grain which rests upon the funnel and the walls and bottom of the tank. Into this chamber air or steam may be admitted, and either comes in contact with the whole mass of grain which is exposed through the perforations in the funnel.

Suitably-constructed valves C should be arranged on each funnel, for controlling the discharge of the grain.

At the open top of the tank is placed a receptacle, D, having a perforated bottom covering the entire top, said receptacle being arranged to rest upon the top of the tank, or to be raised above it when required. This receptacle is intended to contain an absorbent material, such as sponge, sawdust, or the like, and is found to be advantageous in taking up and retaining considerable moisture from the steam contained in the tank.

The chamber at the bottom of the tank is connected, by suitable pipes, with any approved form of pressure-blower or air-condenser, (represented by E,) which should be capable of forcing a volume of from about four thousand to five thousand cubic feet of air per minute into the tank and through the mass of grain under a pressure of about one to one and one-half pound per inch. The pressure-blower should also be connected with an air-heating apparatus suitable for the purpose, preferably one so arranged that the air cannot become impregnated with the gases arising from the fuel used. For all purposes of the present description, the device at F may represent this air-heater. The pipe between the blower and the heater should be capable of being disconnected when required to change the current from heated to cold air.

A steam-pipe, G, at the lower end of the tank, leads from a suitable steam-boiler, and is provided with an intermediate superheating-coil, as at $a$, and should, of course, be provided with suitable valves. (Not indicated in the drawing.)

In practical operation, the absorbent-receptacle is drawn to one side, or otherwise removed from over the top of the tank, in order to afford an opening through which the grain may be admitted, and a free passage for the drying-currents. The tank being properly charged, the blower is started with the hot-air connection, and operated so as to force or draw a volume of heated air through the mass of grain in a manner as previously intimated; and this current of heated air should be allowed to act upon the grain until the heat in the tank is uniform throughout and the temperature up to 230° Fahrenheit, or thereabout. The hot-air current is then turned off and the absorbent-receptacle lowered or replaced upon the top of the tank, closing the mouth thereof. Steam is then admitted through the steam-pipe from a steam-boiler having a pressure of about eighty to one hundred pounds, and a corresponding temperature of about 327° Fahrenheit, which steam, meeting the heated body of grain in the tank, rises and moves in a rapid current through the mass of grain into the absorbent material, leaving but a minimum of condensed steam in the mass.

The purpose or object of using steam at a high pressure upon the grain is to obtain the full effect of its penetrating heat at about 260° Fahrenheit, in order that the life or germ of the grain may be killed, must and such like removed, and growth of fungus prevented, and this accomplished with the least absorption of moisture or condensation of the steam by the grain.

Experience indicates that the moist heat of high-pressure steam acting upon the grain is more beneficial in its effects than dry heat alone, for the reason that it removes the must and other impurities, and restores the grain to its original freshness, color, and flavor without injuring its nutritious properties. The time required for the steam to act upon the grain at the pressure stated need not exceed, say, thirty minutes under ordinarily favorable conditions, provided the temperature of the mass be first brought to about the degree specified above by the heated air.

Immediately after the steam-current, and in continuation thereof, superheated steam is admitted to the tank. This enters freely into the body of the grain and in the best condition to obtain or cause a complete vaporization of the moisture in the mass, because of its increased heat and dryness, and because of its increased pressure and velocity.

When the action of the steam and the superheated steam is completed, the absorbent-receptacle is withdrawn and the hot-air current again turned into the tank. This, containing no moisture, is capable of absorbing and carrying off about sixty grains per cubic foot of air. Therefore, in its rapid current and great volume, it secures a complete removal of all the moisture contained in the mass. This current may be continued in action about thirty minutes at a temperature of 160° to 200° Fahrenheit. The hot-air current being discontinued, a similar volume of cold air is forced through the mass, which rapidly reduces it to its normal temperature, thus completing the process and leaving the grain in perfect condition for immediate shipment or storage in bulk, without danger of damage to it by any of the causes hereinbefore alluded to.

The degrees of heat, amount of pressure, units of time, &c., specified above are more especially applicable in operating upon Indian corn. Manifestly these should be changed to correspond with the nature of the material, with its condition when the process is commenced, and in accordance with other circumstances, as experience will dictate.

We desire it understood that the apparatus herein shown is no essential part of our present invention, and that we propose to use any apparatus whereby our said invention may be carried out; that the invention is independent of the use of the absorbent material alluded to; and, further, that under certain circumstances we propose to dispense with the use of superheated steam or with steam not superheated, using either one or both, accordingly as the circumstances may seem to make it most desirable to do.

When followed out substantially in accordance with the foregoing explanation, it is found that our improved process leaves the grain with all its nutritious properties unimpaired, in an unparched condition, not liable to become damaged or depreciated in value during the time of its storage or while *in transitu* by reason of its own tendency to heat, to grow, &c.; and, withal, in an improved condition for economical uses, so much so that it commands a higher price than when not operated upon.

We are fully aware that currents of air and currents of steam have before been applied to masses of grain for the purpose of curing it, and for drying, cooking, and otherwise operating upon it; but we are not aware of any previously-invented process capable of producing all the desirable effects upon grain in any manner substantially as these effects are produced by our invention, or of any other process so well adapted to the restoration of musty or moldy grain, as well as to the curing of sound grain, as is ours.

To the mere use of the steam or air current, either separately or together, we therefore desire it understood that we make no claim herein.

The apparatus shown is made the subject of a separate application for patent.

The article produced is distinguishable by the preservation of its natural color and freshness, while it is incapable of germinating; by its freedom from all tendency to mold or the presence of any fungus growth; and by a peculiar odor recognizable by any one accustomed to handling it.

Having thus fully described our invention, what we claim as new, and desire to secure by Letters Patent, is—

The process of curing or drying grain, substantially as hereinbefore explained, the same consisting in heating the mass by the application of dry heat, killing the germ of the grain by the application of steam heat, drying the steamed grain by the application of dry heat, and then cooling the heated mass by currents of air, for the purposes and objects named.

FREDERIC A. LUCKENBACH.
ABRAHAM DE BEVOISE.

Witnesses:
H. G. BOND,
A. W. KNAPP.